Patented Aug. 24, 1954

2,687,413

UNITED STATES PATENT OFFICE 2,687,413

PREPARATION OF ALKALI METAL
PENICILLINATES

John C. Sheehan, Arlington Heights, Mass., and Max Tishler, Westfield, N. J., assignors to Merck & Co., Inc., Rahway, N. J., a corporation of New Jersey No Drawing. Original application October 17, 1947, Serial No. 780,588. Divided and this application August 9, 1949, Serial No. 109,417

14 Claims. (Cl. 260—239.1)

This invention is concerned generally with novel processes for manufacturing therapeutically valuable salts of penicillin G. More particularly it relates to an improved method for the preparation of alkali metal salts of penicillin G in substantially pure form and in good yield from readily available starting materials.

This application is a division of our co-pending application Serial No. 780,588, filed October 17, 1947, now abandoned.

When penicillin G is prepared by microbiological fermentation processes, it is obtained in aqueous solution admixed with various other penicillins. Since penicillin G is superior to the other penicillins in the treatment of certain diseases, it is important to be able to prepare alkali metal salts of said penicillin G, in substantially pure form, uncontaminated by salts of the other penicillins. The preferred salt for therapeutic administration is the sodium salt of penicillin G.

Penicillin G can be separated from a mixture containing penicillin G admixed with other penicillins, in the form of a substantially pure amine salt. However, previously known methods for interconverting penicillin salts involve acidification of an aqueous solution of said salt, extraction into a solvent of the acid form of penicillin G, and transfer to aqueous solution by treatment with the base corresponding to the desired cation. This and similar procedures subject the penicillin to strongly acid and basic treatment in aqueous solution, under which conditions penicillin is easily destroyed.

It has been discovered, however, that alkali metal salts of penicillin G can be easily prepared from said amine salts in practically quantitative yield and using only substantially neutral reagents. This is accomplished by metathetically reacting the amine salt of penicillin G and an alkali metal salt of an aliphatic carboxylic acid in solution in an organic liquid. Since alkali metal salts of penicillin G are substantially insoluble in organic liquids, the alkali metal salt of penicillin G, formed by the above reaction, ordinarily precipitates and may be recovered by conventional means. Penicillin G is stable under the conditions employed in this reaction. Previously, it has always been considered necessary to carry out the interconversion of penicillin salts by processes employing refrigeration. When the present process is used, it is possible to carry out the reaction at a temperature of 25° C., or even higher, without appreciable decomposition of penicillin G. Furthermore, the present invention accomplishes the conversion to the important sodium salt and other alkali metal salts of penicillin G without use of the expensive freeze-drying step.

The starting materials herein employed include the salts of penicillin G with alkyl amines, for example, trimethyl amine, triethyl amine, and the like, or with heterocyclic amines, for example, N-methyl-piperidine, N-ethyl-piperidine, N-methyl-morpholine, N-ethyl-morpholine, and the like. Applicants prefer to use the tertiary amine salts of penicillin G since these compounds are readily prepared in pure form.

Any substantially anhydrous, substantially neutral polar organic liquid, which is non-reactive with the penicillin G, can be employed as the reaction solvent, since liquids of this class have a solvent action on the amine salts of penicillin G and on the alkali metal salt reactants. It is ordinarily preferred to employ chlorinated solvents, such as chloroform, $\beta,\beta'$-dichloro-dialkyl ethers, and the like, nitroparaffins, such as nitromethane, dialkylketones, such as acetone, methylethyl ketone, and the like, esters, such as ethyl acetate, alcohols, such as butanol, 2-ethylbutanol, and the like, nitriles, such as acetonitrile, as well as mixtures containing two or more different solvents.

Any alkali metal salt of an aliphatic carboxylic acid can be used since salts of this class yield a solution containing the corresponding cation when mixed with polar organic liquids. Moreover, the alkali metal salts of aliphatic carboxylic acids have been found to be particularly suitable for use in converting amine salts of penicillin G to alkali metal salts of penicillin G, since said alkali metal salts of lower aliphatic carboxylic acids have a solubility in organic liquids substantially greater than the solubility of the corresponding alkali metal salt of penicillin G. Thus, when an amine salt of penicillin G is reacted with an alkali metal salt of a lower aliphatic carboxylic acid, preferably employing merely sufficient organic liquid to produce a substantially saturated solution of said metal salt reactant, the corresponding metal salt of penicillin G formed by metathesis necessarily precipitates, and the reaction proceeds, due to mass action, substantially to completion.

The alkali metal salts of aliphatic carboxylic acids which are ordinarily utilized in carrying out our invention include sodium acetate, sodium 2-ethyl hexoate, potassium 2-ethyl hexoate, and the like. When sodium acetate is utilized it has been found convenient to employ this salt in the form of its hydrate. It is ordinarily preferred to employ the alkali metal 2-ethyl hexoates since these salts possess a considerably greater solubility in organic liquids than the corresponding alkali metal salts of penicillin G, thus making it possible to utilize a minor proportion of organic reaction solvent, and thereby achieving the desired interconversion of the penicillin salts with minimum loss of penicillin due to solubility of the alkali metal salt of penicillin G in said organic reaction solvent. Moreover, the alkali metal 2-ethyl hexoates react readily with amine salts of penicillin G even in solution in essentially anhydrous organic liquids, under which conditions, no decomposition of the penicillin occurs even when the reaction is carried out at temperatures of 25° C., or higher.

The reaction is conveniently carried out by adding a solution of one of the reactants, with stirring, to a solution containing the other reactant, under which conditions the alkali metal salt of penicillin G, formed by the reaction, ordinarily precipitates and can be recovered by conventional means. It should be understood, however, that any method of bringing the alkali metal salt of the aliphatic carboxylic acid and the amine salt of penicillin G together in a polar organic liquid is within the scope of this invention. The crystalline alkali metal salt of penicillin G is ordinarily recovered by filtration or centrifugation and is washed thoroughly with the reaction solvent or other substantially anhydrous organic liquid which is a solvent for the by-product amine salt formed by the metathesis. The product can then be dried at room temperature or above, but preferably in vacuo, to produce, in substantially pure form, the alkali metal salt of penicillin G. The product can be further purified, if desired, by recrystallization from a solvent, such as an aqueous dialkyl ketone.

The following examples illustrate methods of carrying out the present invention, but it is to be understood that these examples are given by way of illustration and not of limitation.

*Example 1*

A solution of 100 g. of the N-ethylpiperidine salt of penicillin G in 500 ml. of chloroform was added to a solution of 33.2 g. of sodium 2-ethylhexoate in 1500 ml. of acetone, with cooling to maintain the temperature between about 25° C. and 30° C. After one hour the crystalline sodium salt of penicillin G was collected by filtration, washed with acetone and dried. Weight 76.6 g.; yield 96.3% of theory. The optical rotation was $(\alpha)_D^{23} = +302°$.

If desired, the product may be recrystallized from aqueous acetone. To a solution of 70 g. of sodium penicillin G in 280 ml. of acetone-water (prepared by mixing 88 ml. acetone and 12 ml. water) was added 2030 ml. of dry acetone. After one hour the pure crystalline sodium penicillin G which crystallized was collected by filtration, washed with acetone and dried; weight 66.7 g.; yield 95.5% of theory, optical rotation $$(\alpha)_D^{23} = +300°$$

Anal. Calc'd for $C_{16}H_{17}O_4N_2SNa$: C, 53.93; H, 4.81; N, 7.86. Found: C, 53.90; H, 4.77; N, 7.75.

*Example 2*

A solution of 1.1 g. of sodium 2-ethylhexoate in 20 cc. of acetone was added to a solution of 1 g. of the N-ethylpiperidine salt of penicillin G in 5 cc. of chloroform and the resulting mixture was shaken occasionally over a one hour period. The crystalline sodium penicillin which precipitated was recovered by filtration and dried. Analysis indicated the product to be approximately 94-96% pure sodium penicillin G.

*Example 3*

About 1.1 g. of sodium 2-ethylhexoate was dissolved in 20 cc. of methyl ethyl ketone and the solution was added to a solution of 1 g. of the N-ethylpiperidine salt of penicillin G in 5 cc. of chloroform, and the mixture was shaken occasionally over a 1 hour period. The crystalline sodium penicillin G which precipitated was recovered by filtration and dried. Analysis indicated that the product was approximately 95% pure sodium penicillin G.

*Example 4*

1.1 g. of sodium 2-ethylhexoate was dissolved in 20 cc. of ethyl acetate, the solution was added to a solution of 1 g. of the N-ethylpiperidine salt of penicillin G in 5 cc. of chloroform, and the mixture was shaken occasionally over a one hour period. The crystalline sodium penicillin which precipitated was recovered by filtration and dried and was found to be approximately 94-96% pure sodium penicillin G.

*Example 5*

1.1 g. of sodium 2-ethylhexoate was dissolved in 20 cc. of 2-ethyl butanol, the solution was added to a solution containing 1 g. of the N-ethylpiperidine salt of penicillin G, and the mixture was shaken occasionally over a one hour period. The crystalline sodium penicillin G which precipitated was recovered by filtration and dried. Analysis indicated that the sodium salt thus produced was 94-96% pure sodium penicillin G.

*Example 6*

A solution of 1.1 g. of sodium 2-ethylhexoate in 20 cc. of butanol was added to a solution of 1 g. of the N-ethylpiperidine salt of penicillin G in 5 cc. of chloroform, and the mixture shaken occasionally over a one hour period. The crystalline sodium penicillin G which precipitated was recovered by filtration and dried and was found by analysis to be 94-96% pure sodium penicillin G.

*Example 7*

1.1 g. of sodium 2-ethylhexoate was dissolved in 20 cc. of $\beta,\beta'$-dichloro-diethyl ether, the solution was added to a solution containing 1 g. of the N-ethylpiperidine salt of penicillin G in 5 cc. of chloroform and the mixture was shaken occasionally over a one hour period. The crystalline sodium penicillin G which precipitated was recovered by filtration and dried. Analysis indicated the product to be 94-96% pure sodium penicillin G.

*Example 8*

A solution of 1.1 g. of sodium 2-ethylhexoate in 20 cc. of acetonitrile was added to a solution of 1 g. of the N-ethylpiperidine salt of penicillin G in 5 cc. of chloroform, and the resulting mixture was shaken occasionally over a one hour period. The crystalline sodium penicillin G which precipitated was recovered by filtration and dried and was found by analysis to be 94-96% pure sodium penicillin G.

*Example 9*

1.1 g. of sodium 2-ethylhexoate was added to a solution containing 1 g. of the N-ethylpiperidine salt of penicillin G dissolved in 5 cc. of chloroform, and the resulting mixture was shaken occasionally over a one hour period. During this time the sodium 2-ethylhexoate went into solution and sodium penicillin G crystallized. This crystalline product was recovered by filtration and dried and as found by analysis to be 94–96% pure sodium penicillin G.

*Example 10*

A solution of 1.1 g. of sodium 2-ethylhexoate in 20 cc. of acetone was added to a solution containing 1 g. of the N-ethylpiperidine salt of penicillin G in 25 cc. of nitromethane, and the resulting mixture was shaken occasionally over a one hour period. The crystalline sodium penicillin G which precipitated was recovered by filtration and dried. Analysis indicated that the product was approximately 80–85% pure sodium penicillin G. This product is purified, if desired by recrystallization from aqueous acetone.

*Example 11*

1.1 g. of sodium 2-ethylhexoate was dissolved in 20 cc. of methyl ethyl ketone, the solution was added to a solution of 1 g. of the N-ethylpiperidine salt of penicillin G in 25 cc. of nitromethane, and the resulting mixture shaken occasionally over a one hour period. The crystalline sodium penicillin G which precipitated was recovered by filtration and dried. Analysis indicated that this product was 80–85% pure sodium penicillin G, which may be further purified, if desired, by recrystallization from aqueous methyl ethyl ketone.

*Example 12*

1.1 g. of sodium 2-ethylhexoate was dissolved in 20 cc. of 2-ethyl butanol, the solution was added to a solution containing 1 g. of the N-ethylpiperidine salt of penicillin G dissolved in 25 cc. of nitromethane, and the resulting mixture was shaken occasionally over a one hour period. The crystalline sodium penicillin G, which precipitated, was recovered by filtration and dried. The sodium salt, thus produced, was found by analysis to be approximately 85% pure sodium penicillin G.

*Example 13*

1.1 g. of sodium 2-ethylhexoate was dissolved in 20 cc. of ethyl acetate and the solution added to a solution containing 1 g. of the N-ethylpiperidine salt of penicillin G dissolved in 25 cc. of nitromethane. The resulting mixture was shaken over a 1 hour period, and the crystalline sodium penicillin G which precipitated was recovered by filtration and dried. Analysis showed this product to be approximately 80–85% pure sodium penicillin G.

*Example 14*

A solution of 1.1 g. of sodium 2-ethylhexoate in 20 cc. of $\beta,\beta'$-dichloro-diethyl ether was added to a solution containing 1 g. of the N-ethylpiperidine salt of penicillin G dissolved in 25 cc. of nitromethane, and the resulting mixture was shaken occasionally over a 1 hour period. The crystalline product which precipitated was recovered by filtration and dried. Analysis showed this material to be approximately 80–85% pure sodium penicillin G.

*Example 15*

1.1 g. of sodium 2-ethylhexoate was dissolved in 20 cc. of acetonitrile and the solution was added to a solution containing 1 g. of the N-ethylpiperidine salt of penicillin G in 25 cc. of nitromethane. The resulting solution was shaken occasionally over a one hour period. The crystalline product which precipitated was recovered by filtration and dried and was found by analysis to be 80–85% pure sodium penicillin G. This product can be further purified, if desired, by recrystallizing from a solvent, such as aqueous acetone.

*Example 16*

2.55 g. of anhydrous sodium acetate was dissolved in 1.7 g. of water to form sodium acetate hydrate and this material was dissolved in 210 cc. of butanol by heating to 60–70° C. To this was added a slurry of 1.40 g. of the N-ethylpiperidine salt of penicillin G in 100 cc. butanol and the whole stirred over a 1 hour period. The crystalline sodium penicillin G thus produced, was recovered by filtration and dried.

*Example 17*

2.55 g. of anhydrous sodium acetate was dissolved in 1.7 g. of water to form the hydrate and this material was dissolved in 210 cc. of butanol by heating to 60–70° C. To this was added a slurry of 14.0 g. of the cyclohexyl amine salt of penicillins (predominantly G) in 100 cc. butanol and the whole stirred over a one hour period. The crystalline sodium penicillin, thus produced, was recovered by filtration and dried.

Modifications may be made in carrying out the present invention without departing from the spirit and scope thereof. Insofar as these changes and modifications are within the purview of the annexed claims, they are to be considered as part of our invention.

We claim.

1. The process of preparing alkali metal salts of penicillin G which comprises reacting, in solution in organic solvent, an amine salt of penicillin G and an alkali metal 2-ethylhexoate.

2. The process of preparing alkali metal salts of penicillin G which comprises metathetically reacting, in solution in a substantially anhydrous organic liquid, an amine salt of penicillin G and an alkali metal 2-ethylhexoate, said alkali metal 2-ethylhexoate having a solubility in said organic liquid considerably greater than the solubility of the corresponding metal salt of penicillin G.

3. The process of preparing alkali metal salts of penicillin G which comprises metathetically reacting, in solution in a substantially anhydrous organic liquid, an amine salt of penicillin G and an alkali metal 2-ethylhexoate, said alkali metal 2-ethylhexoate having a solubility in said organic liquid considerably greater than the solubility of the corresponding metal salt of penicillin G, and the amount of said organic liquid being merely sufficient to produce a substantially saturated solution of said alkali metal 2-ethylhexoate, whereupon the corresponding alkali metal salt of penicillin G formed by metathesis precipitates.

4. The process of preparing the sodium salt of penicillin G which comprises metathetically reacting, in solution in a substantially anhydrous organic liquid, an amine salt of penicillin G and sodium 2-ethylhexoate, said sodium 2-ethylhexoate having a solubility in said organic liquid considerably greater than the solubility of the sodium salt of penicillin G.

5. The process of preparing the sodium salt of penicillin G which comprises metathetically reacting, in solution in a substantially anhydrous organic liquid, an amine salt of penicillin G and sodium 2-ethylhexoate, said sodium 2-ethylhexoate having a solubility in said organic liquid considerably greater than the solubility of the sodium salt of penicillin G, and the amount of said organic liquid being merely sufficient to produce a substantially saturated solution of said sodium 2-ethylhexoate, whereupon the sodium salt of penicillin G formed by metathesis precipitates.

6. The process of preparing the sodium salt of penicillin G which comprises reacting, in solution in organic solvent, the N-ethylpiperidine salt of penicillin G and sodium 2-ethylhexoate.

7. The process of preparing the sodium salt of penicillin G which comprises reacting the N-ethylpiperidine salt of penicillin G with sodium 2-ethylhexoate, said reaction being carried out in solution in a substantially anhydrous organic solvent comprising chloroform.

8. The process of preparing the sodium salt of penicillin G which comprises mixing a chloroform solution containing the N-ethyl-piperidine salt of penicillin G with an acetone solution containing sodium 2-ethylhexoate.

9. The process of preparing the sodium salt of penicillin G which comprises mixing a chloroform solution containing the N-ethylpiperidine salt of penicillin G with an acetone solution containing sodium 2-ethylhexoate, the amounts of chloroform and acetone being merely sufficient to produce a substantially saturated solution of sodium 2-ethylhexoate in the resulting mixture thereof, whereupon the sodium salt of penicillin G formed by metathesis precipitates.

10. The process of preparing the potassium salt of penicillin G which comprises reacting, in solution in organic solvent, the N-ethylpiperidine salt of penicillin G and potassium 2-ethylhexoate.

11. Process for the formation of an alkali metal salt of penicillin which comprises metathetically reacting an amine salt of penicillin with an alkali metal 2-ethyl hexoate in a lower alkanol solution.

12. Process for the formation of an alkali metal salt of penicillin which comprises metathetically reacting an amine salt of penicillin with an alkali metal salt of a branched chain lower alkanoic acid in a lower alkanol solution.

13. Process for the formation of an alkali metal salt of penicillin which comprises metathetically reacting an amine salt of penicillin with an alkali metal 2-ethyl hexoate in a polar organic solvent solution.

14. Process for the formation of an alkali metal salt of penicillin which comprises metathetically reacting an amine salt of penicillin with an alkali metal salt of a branched chain lower alkanoic acid in a polar organic solvent solution.

No references cited.